W. H. BROWN & I. OSGOOD.
Handle for Table-Knife.
No. 209,649. Patented Nov. 5, 1878.
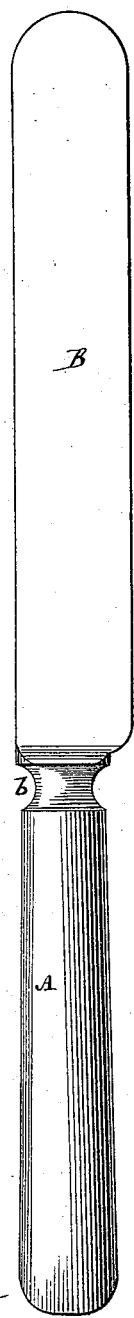
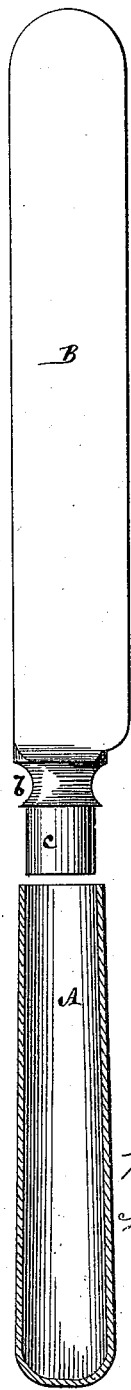

UNITED STATES PATENT OFFICE.

WILLIAM HENRY BROWN, OF WATERBURY, CONNECTICUT, AND ISAAC OSGOOD, OF UTICA, NEW YORK.

IMPROVEMENT IN HANDLES FOR TABLE-KNIVES.

Specification forming part of Letters Patent No. 209,649, dated November 5, 1878; application filed January 23, 1878.

*To all whom it may concern:*

Be it known that we, WILLIAM HENRY BROWN, of Waterbury, in the county of New Haven and State of Connecticut, and ISAAC OSGOOD, of Utica, in the county of Oneida and State of New York, have invented a new and useful Improvement in Table-Knives and other cutlery, of which the following is a description, reference being had to the accompanying drawings, forming part of this specification.

This invention more particularly relates to table-knives and other articles of table-cutlery having metallic handles.

The object of the invention is not only to simplify and reduce the cost of manufacture of such cutlery, but to produce stiffer and more durable articles.

The invention consists in a hollow handle for table-knives and other cutlery composed of a seamless wrought or drawn shell of steel or other sufficiently firm and hard metal, with which the blade or body of the article is or may be united by soldering or otherwise.

Although the invention is not necessarily restricted to table-knives, it will here suffice to describe it as applied to such a knife.

Figure 1 of the drawings represents a side view of a table-knife having a handle constructed in accordance with our invention. Fig. 2 represents a side view of the blade of said knife and a longitudinal section of the handle. Fig. 3 is a longitudinal section of a cylindrical metallic shell of which the handle is composed, as it appears before being finally shaped to form the handle shown in Figs. 1 and 2.

A, in Figs. 1 and 2, is the hollow handle of a table-knife, of which B is the blade. This handle is formed of a steel or other suitable metal shell, which may be produced from a disk or blank of sheet metal by first cupping said disk or blank, and afterward drawing it in dies into an elongated cylindrical form, as shown in Fig. 3 of the drawings. When said shell is made of steel or iron, we generally propose to tin the blank or cup by dipping it in molten tin, to facilitate the drawing of it into the elongated cylindrical form shown in Fig. 3, and in which form the drawn shell might be used as a handle without further manipulation; but it is preferred to give it a more definite or convenient handle shape, as shown, for instance, in Figs. 1 and 2. To this end, after having drawn the shell to a suitable length and size, as shown in Fig. 3, it is brought to its required finished shape—such, for instance, as shown in Figs. 1 and 2—in any suitable way or by any suitable process or processes—as, for instance, by inserting the elongated cylindrical shell (shown in Fig. 3) in a sectionally-constructed female die of an interior configuration corresponding with the exterior of the handle in Figs. 1 and 2, and inserting within the cylindrical shell a sectionally-constructed male die corresponding in shape with that of the interior of the handle, as shown in Fig. 2, so that on suitable pressure being applied the handle will be made to conform to the shape of said dies inside and out. Or the handle may be shaped in any other suitable way.

Instead of first cupping the blank and drawing the shell in cylindrical form, as herein described, the blank may be cupped and the shell drawn of an oval form in transverse section, which will greatly simplify the operation of finishing the handle to the desired shape.

To attach the handle A to the blade B of the knife, said blade is formed with a bolster, $b$, and with a shank, $c$, which fit into the mouth of the hollow handle or shell, and the blade and the handle are united by soldering or otherwise—as, for instance, by tinning the interior of the shell and the exterior of the shank, and inserting the shank $c$ as far as the bolster $b$ into the hollow handle or shell A, and then soldering the blade and handle together by sweating.

We are aware that the patents of J. O. Ely, February 9, 1869, No. 86,657, and J. H. Nichols and W. Bower, of January 25, 1870, No. 99,104, describe and show knife-handles formed in one piece of cast metal, formed upon a solid core, which remains in the handle; and another patent to said Nichols and Bower, of March 15, 1870, describes a hollow knife-handle, constructed of cast metal in two pieces; also, that the patent to Leroy S. White, of March 27, 1866, No. 53,546, shows and describes a knife-handle constructed of a seamless tube drawn into shape, and having its end closed by an additional piece of metal; and these we do not claim, because they do not show the feature of our invention, which is a seamless shell, made in one piece, with a closed end, and brought into the desired shape or form from wrought metal or from steel, by a drawing action upon the metal, and which, so far as we are aware, is new, and is valuable and important, and light and durable, and cannot be broken or injured by ordinary usage.

Having thus described our invention, we claim—

As an improvement in table-knives or other articles of cutlery, a handle for the same having a closed butt or end, all made of a seamless wrought or drawn metallic shell, substantially as herein shown and described, for the purpose specified.

WM. HENRY BROWN.
ISAAC OSGOOD.

Witnesses to the signature of William Henry Brown:
P. J. KEATING,
SAMUEL KEELER.

Witnesses to the signature of Isaac Osgood:
C. R. HUNTLEY,
JOHN BROWN.